July 5, 1932.  H. F. HOBBS  1,865,910
AUTOMATICALLY VARIABLE TRANSMISSION GEAR PARTICULARLY FOR MOTOR VEHICLES
Filed Sept. 22, 1930  3 Sheets-Sheet 1
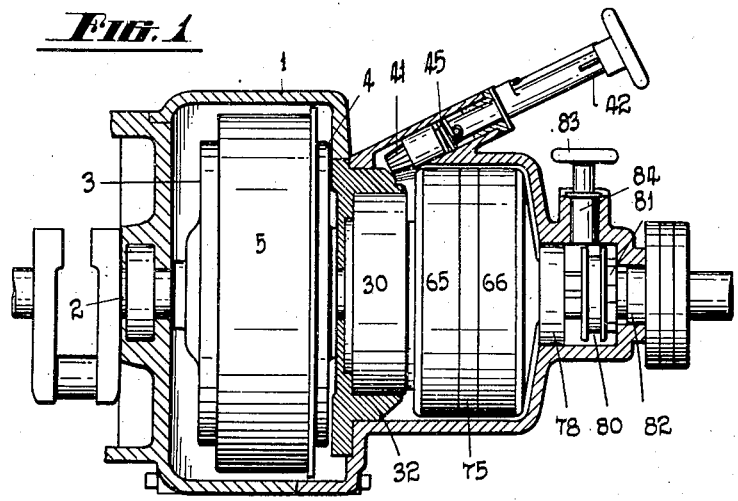
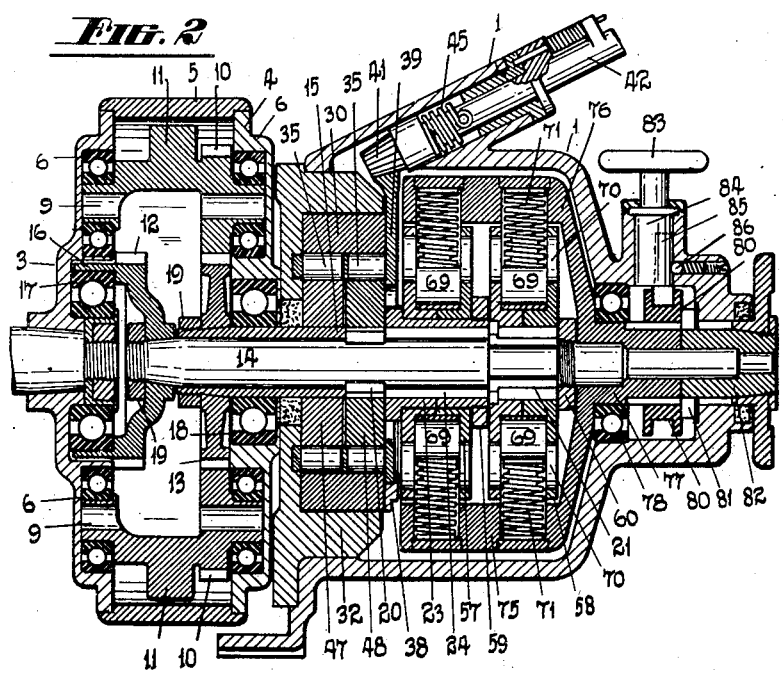
INVENTOR
H. F. Hobbs
BY
ATTORNEYS

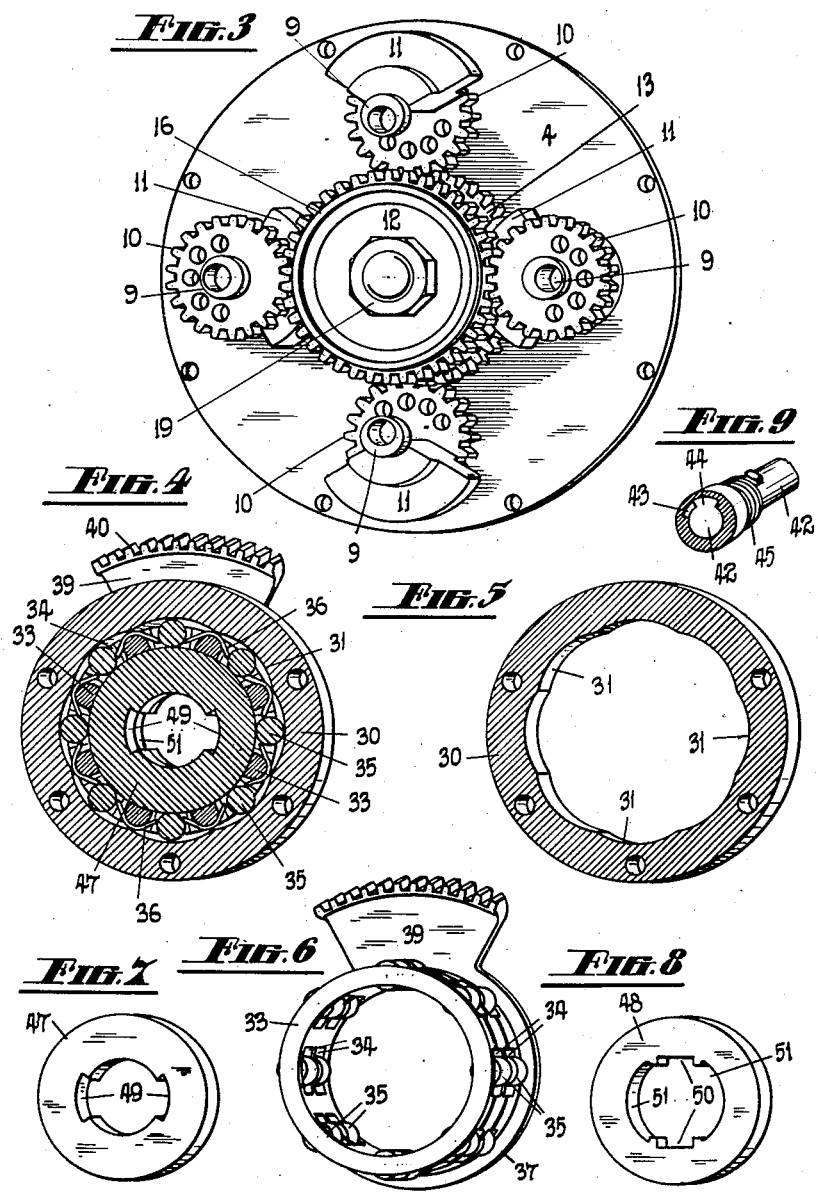

July 5, 1932. H. F. HOBBS 1,865,910
AUTOMATICALLY VARIABLE TRANSMISSION GEAR PARTICULARLY FOR MOTOR VEHICLES
Filed Sept. 22, 1930 3 Sheets-Sheet 3
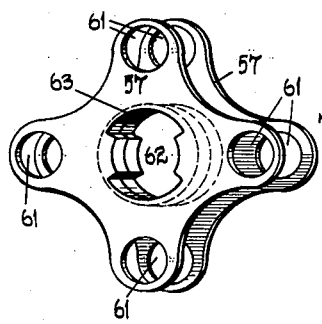
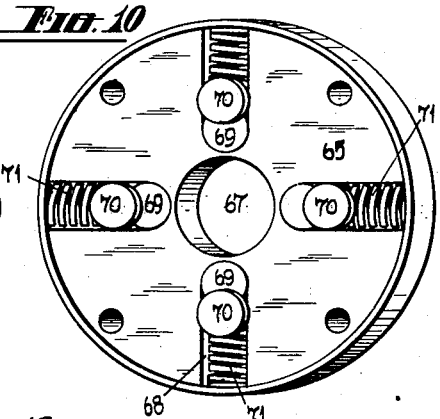
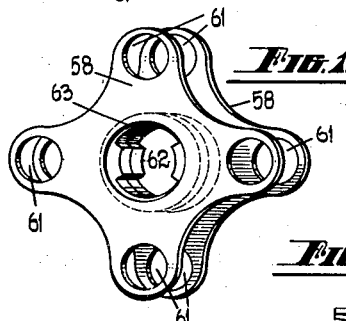
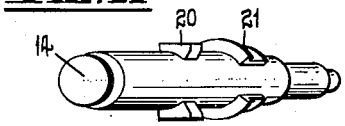
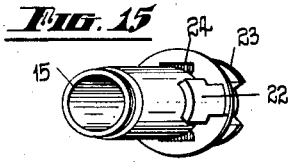
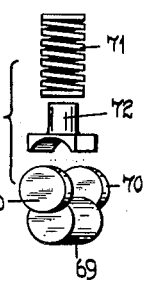
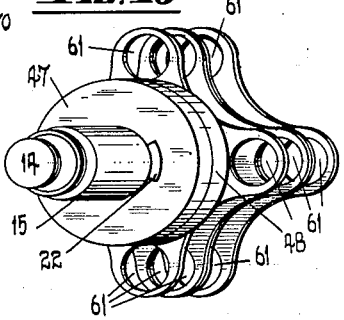
INVENTOR
Howard F. Hobbs
BY
ATTORNEYS Patented July 5, 1932

1,865,910

UNITED STATES PATENT OFFICE

HOWARD FREDERICK HOBBS, OF PARADISE, SOUTH AUSTRALIA, AUSTRALIA

AUTOMATICALLY VARIABLE TRANSMISSION GEAR PARTICULARLY FOR MOTOR VEHICLES

Application filed September 22, 1930, Serial No. 483,656, and in Australia April 4, 1930.

The purpose of this invention is to provide an improved variable transmission gear in which the ratio of speeds between the driver and the driven shafts will be automatically varied to compensate for difference in speed and load, such gear being especially suitable for the power transmission in motor vehicles.

According to this invention a series of weights are caused to move first eccentrically and finally concentrically about concentric shafts, one of such shafts (the driver) rotating in a fixed direction and moving the weights around with it, the other (the driven) being rotated in a constant but variable direction through two or more intermediate concentric shafts which intermediate shafts have means to cause the weights to move eccentrically in all speeds other than when the driver and driven shafts are rotating at the same speed and in the same direction. The drive exerted by the intermediate shafts by the action of the weights is at first in an alternating direction, then in the one direction but at an alternating speed and finally at the same speed as the driver shaft. In the first case however the drive in one direction is prevented by a ratchet gear and is thus turned into constant unidirectional impulses, the direction being changeable at will by means of the ratchet gear. In the second case the ratchet does not operate. In both these cases the impulses are transferred to the driven shaft as a steady rotation by flexible couplings between the intermediate shafts and the driven shaft. In the third case the speeds of the driver and of the driven shaft are equal and in the same direction and the weights then move concentrically about the shafts and transmit a steady unidirectional drive to the intermediate shafts and thus through the flexible couplings to the driven shaft.

In order that my invention may be the more clearly understood I will describe the same with reference to the accompanying drawings in which:—

Fig. 1 is a side elevation of my improved gear, showing it connected between the crank shaft and tailshaft of a motor vehicle and showing the housing of the gear in section.

Fig. 2 is a central vertical section of the gear.

Fig. 3 is a perspective view of the two pairs of weights and their driving connections used in the gear shown in Fig. 2, the front plate of the frame or casing being omitted.

Fig. 4 is a cross sectional perspective view of the ratchet gear.

Fig. 5 is a similar cross sectional view showing only the fixed or outer member of the ratchet gear.

Fig. 6 is a perspective view of the roller cage of the ratchet gear.

Figs. 7 and 8 are perspective views of the rotating or inner members of the ratchet gear.

Fig. 9 is a cross sectional perspective view showing especially the connection between the hand wheel and pinion of the cage adjustment and holding device.

Fig. 10 is a perspective view of one of the driven members of the flexible couplings showing the short crank-shaped links and the springs in position.

Fig. 11 is a longitudinal section of the fly wheel which embodies a pair of the driven members shown in Fig. 10.

Figs. 12 and 13 show in perspective the two driving members or shaped plates of the flexible couplings.

Figs. 14 and 15 are perspective views of the two intermediate shafts.

Fig. 16 shows in perspective the general arrangement of the two intermediate shafts, the rotating members of the ratchet gear, and the driving members or shaped plates of the flexible couplings.

Fig. 17 shows in perspective one of the short crank-shaped links, saddles and springs of the flexible couplings.

Figs. 2 to 17 are drawn to the same scale, it being slightly larger than that used in Fig. 1.

According to the preferred construction which is that shown in the drawings the drive shaft 2 from the engine of the vehicle has rigidly secured upon its end a frame or casing which carries the sets of weights and also acts as a fly wheel to the engine.

The frame or casing comprises a front and rear plate 3 and 4 and an annular distance piece 5 all rigidly held together. The two plates have recesses in which are the bearings 6 for the several sets of weights and also bearings 17 and 18 for the intermediate shafts.

Each set of weights 11 comprises a number of identical parts each comprising a spindle 9 a pinion 10 and a block 11, the pinion 10 being on any convenient part of the spindle 9 but the block 11 projecting out from same so that its centre of gravity is some distance from the axis of the spindle. I prefer to form the spindle pinion and block from one piece as shown in the drawings but this is not essential.

The spindles 9 of the two sets of weights 11 are equally spaced around the plates 3 and 4 of the frame or casing, the two blocks 11 of each set being diametrically opposite each other and so set that they commence their inward movement or their outward movement at the same time.

The pinions 10 of each set of weights engage gear wheels 12 and 13 upon intermediate shafts 14 and 15, one shaft for each set, such shafts being in line with the driver shaft 2 and having their ends supported in the bearings 17 and 18 in the plates 3 and 4 of the frame or casing. The one shaft 14 shown more particularly in Fig. 14 and which I will call the inner intermediate shaft has the gear wheel 12 secured upon it, such gear wheel having an annular flange 16 which fits over a ball bearing 17 located in the front plate 3; the other shaft 15 shown more particularly in Fig. 15 and which I will call the outer intermediate shaft is hollow and fits over the inner shaft 14. It has the rear gear wheel 13 secured upon it and is supported by a ball bearing 18 located in the rear plate 4. The two gear wheels are held to the shafts by lock nuts 19.

The inner intermediate shaft 14 is somewhat longer than the outer intermediate shaft 15 and has a pair of projecting lugs 20 and a shaped enlarged portion 21 upon it. Its rear end is of a decreased diameter.

The outer intermediate shaft 15 also has two lugs 22 and a shaped enlarged portion 23, the material between the rear half of the lugs 22 and the enlarged portion 23 being cut away to allow the lugs 20 on the inner shaft to project through when the shafts are assembled. The enlarged portion is internally slotted at 24 to allow it to be pushed over the lugs 20 on the inner shaft when assembling.

The ratchet gear 30 to 51, the purpose of which is to check any rotation of the intermediate shafts in a direction opposite to that which is required, comprises an outer fixed member a roller cage and two inner rotating members. The outer member consists of a circular ring 30 concentric with the intermediate shafts 14 and 15 having in its inner face a number of curves 31 of a radius somewhat smaller than the radius of the inside of the ring. The ring is rigidly secured to a block 32 and this is secured to the housing 1 of the gear.

The roller cage consists of a cage 33 having two rows of holes 34 through it, the holes in each row being adjacent the curves 31 in the outer fixed member 30. Within each of the holes is a roller 35 of diameter slightly greater than the thickness of the cage. The holes 34 are sufficiently long to allow the rollers 35 a small amount of radial movement, but springs 36 are provided to normally hold such rollers in the central position in the holes 34. The cage 33 is provided with means for setting and holding it in position comprising a flange 37 upon its back which contacts on the one side with the outer member 30 and on the other side with a guard 38 attached to the outer member, the flange 37 having an upwardly projecting portion 39 which has a number of teeth 40 upon its top which are engaged by a small pinion 41 on a control shaft 42. The pinion 41 is loose on the shaft 42 but has within it a slot 43 which fits over a key 44 upon the shaft. The slot is of greater width than the key, and the pinion 41 can thus rock upon the shaft 42 but it is normally held in its one position by a spring 45 which has its one end connected to the pinion 41 and its other end connected to the shaft 42. This gives a slight flexibility and allows the cage 33 to adapt itself to its best working position. The shaft 42 may be locked in position by a dog and rack.

The two inner rotating members 47 and 48 fit neatly within the cage 33 and the rollers 35 contact with the outer faces of the members 47 and 48. The one inner rotating member 47 is attached to the outer intermediate shaft 15 the slots 49 on the member engaging the lugs 22 upon that shaft and locking the member thereto. The other inner rotating member 48 is attached to the inner intermediate shaft 14 the slots 50 in that member engaging the lugs 20 upon that shaft. The cut-away portions 51 are for assembly and also to clear the lugs 22 upon the outer intermediate shaft when working so as to allow radial movement between the two intermediate shafts.

In operation by setting the cage 33 slightly to one side the rollers 35 are brought nearer to that end of the curved faces 31 of the outer member 30 while the cage 33 prevents them moving towards their other ends, and should the intermediate shafts 14 and 15 be rotated in the direction of the set of the cage the rollers 35 will immediately wedge between the outer member 30 and the inner members 47 and 48 and hold the intermediate shafts firmly to the housing 1 of the gear but leave it free to rotate in the opposite direction as the rollers 35 will strike the ends of the holes 34 in the cage 33 preventing them from passing towards that end of the curved faces 31 of the outer member 30 and so wedging.

By setting the cage in the opposite direction the intermediate shafts 14 and 15 are held against rotation in that direction.

By setting the cage to its central position the intermediate shafts 14 and 15 are free to rotate in either direction.

Just behind the ratchet gear are the flexible couplings 57 to 72 which link the intermediate shafts 14 and 15 to the driven shaft 77. Each of these couplings comprises a pair of shaped plates 57 and 58 and a slotted disc with crank-shaped links and springs connecting them.

The pair of shaped plates 57 shown more particularly in Fig. 12 fit over the shaped enlarged portion 23 on the outer intermediate shaft 15 and are secured thereto by a locknut 59.

The pair of shaped plates 58 shown in Fig. 13 fit over the shaped enlarged portion 21 on the inner intermediate shaft 14 and are secured thereto by a locknut 60.

Each of the plates of the pairs 57 and 58 is shaped as shown and has four perforations 61 near its outer edge, a perforated centre 62 and a shoulder 63 near its centre to act as a distance piece when assembled.

The two slotted discs 65 and 66 fit one between the pair of plates 57 and one between the pair of plates 58 each disc centre having a perforation 67 which is a bearing fit over the shoulders 63 of its pair of plates. There are four radial slots 68 in each disc and these accommodate the centre portion 69 of the crank-shaped links 69—70. Each link is normally held in its innermost position as shown in Fig. 10 by a spring 71 bearing at its one end against a shoe 72 fitting on to the centre portion 69 of that link and at its other end against the end of its accommodating slot 68. The two end portions 70 of the crank-shaped links fit into the perforations 61 of the plates.

This coupling allows a certain amount of radial flexibility between the intermediate shafts 14 and 15 and the driven shaft 77, as when the intermediate shafts 14 and 15 are rotated the centre portions 69 of the links can roll part way up the slots 68 in the discs 65 and 66 on the driven shaft against the pressure of the springs 71, but this movement is limited by the links assuming a tangential position in relation to the circumference of the discs whereupon the intermediate shafts 14 and 15 and the driven shaft 77 rotate as one. The springs constantly tend to return the parts to their original positions.

The two discs 65 and 66 are connected together by bolts, there being an interposed ring 75, and are connected to a disc-like plate 76 which has a short hollow shaft 77 at its centre. This shaft is usually referred to as the driven shaft and is supported in a ball bearing 78 in the housing 1 and has on its rear part a number of splines 79. Fitting over this end of the shaft 77 and engaging the splines 79 is a short collar 80 having teeth 81 which engage complementary teeth upon a second short shaft 82, the tail shaft connection, but is adapted to be slid along the splines 79 until the sets of teeth 81 are disengaged. The collar 80 is slid along and held in position by a hand wheel 83 and stem 84 the latter having a pin 85 eccentrically mounted to engage the collar 80. The hand wheel 83 is held in position by a spring controlled ball 86 engaging holes in the stem 84. By this latter mechanism the shaft 82 which connects with the tail shaft of the vehicle can thus be connected to or disconnected from the gear.

The discs 65 and 66 the ring 75 and the plate 76 form a flywheel to assist the flexible couplings to hold the drive steady.

Although the above described mechanism is the preferred form of my invention it is to be understood that instead of two sets of weights ratchets and flexible couplings I may use a number greater than two, since the more sets of weights are used the smoother the power transmission will be.

I will now describe the operation of my device.

When the driver shaft 2 is rotated it carries with it the plates 3 and 4 which are attached to it and which carry the several sets of weights 11. When starting as these sets of weights 11 move around their respective intermediate shafts 14 and 15 they also are rotated about their spindles 9 through the pinions 10 on the spindles meshing with their respective gear wheels 12 and 13 upon the intermediate shafts 14 and 15 which shafts are then stationary or gradually speeding up and thus the centres of gravity of the weights trace out an eccentric path around the axis of the driver shaft 2.

It will be seen that the weights in their eccentric course may move inwards once for part of a revolution or once for one or more revolutions depending upon the difference in speeds between the driver and driven shafts.

As the speed of the driver shaft 2 increases the centrifugal force on the weights increases causing them to exert a greater driving force.

Acting against this force, however, is the resistance of the intermediate shafts 14 and 15 which are connected by the flexible couplings 57—72 to the driven shaft 77 the resistance of which is governed by the load upon it.

As the weights 11 are being rotated their centres of gravity are being pulled inwards against the outward action of the centrifugal force for half of their revolution about the spindles 9 and are pulled outwards by the action of the centrifugal force for the other half of their revolution.

Thus it will be seen that the weights 11 require a driving force during their inward movement, but give a driving force during their outward movement. Thus the reaction of each set of weights 11 during its inward movement tends to drive the intermediate shaft 14 or 15, connected to it through the pinions 10 and the gear wheels 12 or 13, around in the same direction as the driver shaft 2 is rotating, but during the outward movement each set tends to drive the intermediate shaft in the opposite direction.

Each of the intermediate shafts 14 and 15 thus tends at first to be driven in a forward and backward alternating direction but by means of the ratchets 30—51 all movement in one direction is prevented, each intermediate shaft thus rotating in one direction only, but by a series of short impulses. The flexible drive couplings 57—72 between the intermediate shafts 14 or 15 and the driven shaft 77 turn these impulses into a constant rotation by storing in the springs 71 part of the force imparted to them during the impulse of the intermediate shaft, the springs giving such force back to the driven shaft 77 during the time when the intermediate shaft is held stationary.

As the two sets of weights are set opposite each other it will be seen that their impulses are alternate and thus in conjunction with the flexible couplings which as shown above differentiate between the maximum and minimum drive, a steady automatically variable low ratio drive in either direction is given, the direction depending only on the positioning of the cage which controls the ratchet rollers.

When the ratchet gear 30—51 is so set that the driver shaft 2 and the driven shaft 77 are rotating in the same direction the ratio of speeds between the driver and driven shafts will at first be greatly different, but as it continues and the speed of the driven shaft 77 increases the inward stroke of the weights 11 will drag the intermediate shafts 14 and 15 through a greater angle (as both shafts are rotating in the same direction), and the tendency of the intermediate shafts 14 and 15 to move backward will decrease until it is only a slowing down movement, the ratchets then ceasing to operate.

The flexible couplings 59—72 in this case again store part of the force imparted to them during the impulses or speeding up of the intermediate shafts 14 and 15 in the springs 71, the springs giving such force back to the driven shaft 77 during the slowing down period of the intermediate shafts and thus differentiating between the maximum and minimum drive. This gives an intermediate drive having an automatically variable ratio, the resultant drive being in a forward direction. When the speed is such that the force exerted by the weights is greater than the resistance of the intermediate shafts the weights take up a constant position which is governed by the amount of flexibility of the springs in the coupling and by the driving force on the shaft 2 and the resistance of the shaft 77. The resultant speed between the driver and driven shafts is in this case of a one to one ratio.

The forces produced by the several sets of weights are in the lower ratios more or less independent but as the ratio increases, and especially when the one to one is reached, the independent action is lost and the whole of the weights work in conjunction.

What I claim is:—

1. An automatically variable transmission gear comprising a driving shaft, at least two sets of planetary masses carried by the driving shaft, an intermediate shaft for each set of masses, connections between each intermediate shaft and its associated set of masses whereby the intermediate shaft is operated by the centrifugal impulses of the masses, a clutch device for each intermediate shaft, each device preventing the associated intermediate shaft from rotating in a direction other than the required direction, a driven shaft, and a flexible coupling between each intermediate shaft and the driven shaft so that each set of masses and associated intermediate shaft is independently flexibly coupled to the driven shaft.

2. An automatically variable transmission gear as in claim 1 wherein means are provided between each intermediate shaft and the driven shaft for limiting the relative rotary movement in each direction between the intermediate shaft and the driven shaft.

3. An automatically variable transmission gear as set forth in claim 1 wherein each of the flexible couplings between the intermediate shafts and the shaft to be driven comprises a pair of plates rigidly secured to its intermediate shaft, a slotted disc rigidly secured to the shaft to be driven, crank-shaped links joining the plates to the disc their centres being adapted to roll in the slots and their ends rotatable in the plates, and springs tending to hold the link centres in their innermost position in the slots, substantially as described and for the purpose set forth.

4. In an automatically variable transmission gear as set forth in claim 1, a clutch between the gear and the tail shaft substantially as described and for the purpose set forth.

5. In an automatically variable transmission gear as set forth in claim 1 a clutch between the gear and the tailshaft comprising a collar upon the driven shaft slidable but not rotatable thereon, teeth upon the collar, complementary teeth upon the tailshaft, means for sliding and holding the collar comprising a hand wheel and stem, the stem carrying an eccentrically positioned pin engaging the collar, and the stem having a number of indentations adapted to be engaged by a spring controlled ball carried by the case, substantially as described and for the purpose set forth.

In testimony that I claim the foregoing as my invention I have signed my name this 19th day of August, 1930.

HOWARD FREDERICK HOBBS.